(12) United States Patent
Lee et al.

(10) Patent No.: US 6,819,361 B1
(45) Date of Patent: *Nov. 16, 2004

(54) SOLID-STATE IMAGING DEVICE INTO WHICH OPTICAL LOW PASS FILTER IS INTEGRATED

(75) Inventors: Jae Chul Lee, Seoul (KR); Sung Woo Lim, Chonlabuk-Do (KR); Chun Soo Ko, Daejeon (KR); Shi Ho Kim, Daejeon (KR); Yong Ho Oho, Daejon (KR)

(73) Assignee: Havit Co., Ltd, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/572,700

(22) Filed: May 16, 2000

(30) Foreign Application Priority Data

Nov. 17, 1999 (KR) ......................................... 1999-51028

(51) Int. Cl.⁷ .............................................. H04N 5/225
(52) U.S. Cl. ..................................... 348/342; 348/374
(58) Field of Search ........................... 348/342; 359/576

(56) References Cited

U.S. PATENT DOCUMENTS

| | | | | |
|---|---|---|---|---|
| 4,009,939 A | * | 3/1977 | Okano | 359/589 |
| 4,083,627 A | * | 4/1978 | Okano | 359/574 |
| 4,178,611 A | * | 12/1979 | Okano | 348/291 |
| 4,795,236 A | * | 1/1989 | Ise | 359/569 |
| 4,896,217 A | * | 1/1990 | Miyazawa et al. | 348/340 |
| 5,467,224 A | * | 11/1995 | Ohnishi et al. | 359/614 |
| 5,513,025 A | * | 4/1996 | Watanabe et al. | 349/106 |
| 5,559,599 A | * | 9/1996 | Michel | 356/499 |
| 5,754,342 A | * | 5/1998 | Ohnishi et al. | 359/569 |
| 6,084,715 A | * | 7/2000 | Aoki et al. | 359/627 |
| 6,404,554 B1 | * | 6/2002 | Lee et al. | 359/576 |

* cited by examiner

Primary Examiner—Wendy R. Garber
Assistant Examiner—Nelson D. Hernandez
(74) Attorney, Agent, or Firm—Dykema Gossett PLLC

(57) ABSTRACT

A solid-state imaging device into which is integrated an optical low pass filter serving as the transparent window thereof, this integrated structure simplifying the configuration of the imaging system, reducing its size and manufacturing cost. The optical low pass filter is configured of an optical phase grating low pass filter to obtain satisfactory frequency characteristics. The optical low pass filter is constructed in such a manner that a grating with a predetermined thickness, generating the phase shift of $\phi$, a grating whose thickness is twice the $\phi$-phase shift grating, generating the phase shift of $2\phi$, and a grating portion generating the phase shift of 0 form a basic pattern, the basic pattern being periodically arranged.

2 Claims, 15 Drawing Sheets

X: DISTANCE BETWEEN PICTURE ELEMENTS IN x-DIRECTION
Y: DISTANCE BETWEEN PICTURE ELEMENTS IN y-DIRECTION $$dn = t \frac{n_e^2 - n_0^2}{2 n_e n_o}$$

OPERATION OF THREE-PLATE DOUBLE REFRACTION FILTER=
4-BEAM SPLITTER

SOLID-STATE IMAGING DEVICE INTO WHICH OPTICAL LOW PASS FILTER IS INTEGRATED

BACKGROUND OF THE INVENTION

1. Field of the Invention

The present invention relates to an imaging system utilizing a solid-state imaging device and, more particularly, to a method of constructing the transparent window of the solid-state imaging device using an optical low pass filter. The invention integrates the optical low pass filter into the solid-state imaging device to simplify the configuration of the imaging system, reducing its size and manufacturing cost. The present invention provides a solid-state imaging device having excellent frequency characteristic and a method for constructing the same by using a phase grating as the optical low pass filter.

2. Description of the Related Art

In a charge coupled device (CCD) image sensor currently widely used as an image sensor or a CMOS image sensor that has been using since 90s, the image sensors configured of light receiving elements are two-dimensionally arranged to convert input images into electrical signals.

FIG. 1 shows the configuration of a conventional camcorder or digital camera system. A motion picture or still picture 1 to be imaged is focused by an optical lens arrangement 3 and then passes through an optical low pass filter 2 to enter a light receiving element constructed on the surface of an image sensor 4. The optical lens arrangement 3 consists of appropriate optical lenses such as concave lens and convex lens in order to focus the input image 1 on the imaging device 4. The optical lens arrangement 3 or optical low pass filter of FIG. 1 usually includes an UV filter or IR filter for respectively blocking ultraviolet rays or infrared rays contained in the input image 1. The UV or IR filter is generally constructed in a manner that an appropriate material is coated on a lens or a transparent substrate. To restore the image inputted to the solid-state imaging device to the original state in the imaging system of FIG. 1, it is required that the optical low pass filter 2 has a cutoff frequency that is one-half the sampling spatial frequency.

FIG. 2 shows an ideal sampling in case where the repetitive period of the light receiving element is X in direction x and Y in the direction y in the two-dimensional image sensor. If an image having the spatial frequency spectrum of FIG. 3A is imaged using the two-dimensional sensor having the spatial sampling characteristic of FIG. 2, the sampled image has the spatial frequency spectrum of FIG. 3B in which the original image's spatial frequency spectrum is repeated. In FIG. 3B, the frequency spectrum of the sampled image has a repetitive period corresponding to the reciprocal of the sampling interval, that is, 1/X in the x-direction and 1/Y in the y-direction. Accordingly, to restore the image inputted to the two-dimensional image sensor to the original state, it is required that an optical low pass filter which passes the spectrum corresponding to one period starting from the starting point but cuts off a spatial frequency higher than this.

As described above, to restore the image inputted to the solid-state imaging device to the original state, it is the most ideal that the optical low pass filter 2 of FIG. 1 has the cutoff frequency that is one-half the sampling spatial frequency. Here, the sampling spatial frequency corresponds to the reciprocal of the repetitive period of the light receiving element of the solid-state imager. That is, in the two-dimensional light receiving element arrangement of FIG. 2, $$f_s = \frac{1}{d} \text{ and } f_c = \frac{f_s}{2} = \frac{1}{2d},$$

where d is X in the x-direction and Y in the y-direction. Here, $f_s$ represents the sampling frequency and $f_c$ represents the cutoff frequency of an ideal optical low pass filter.

FIG. 4 shows the spatial frequency transfer characteristic of the optical lens arrangement. The frequency band defined by a dotted line in FIG. 4 is the frequency transfer function of an ideal optical low pass filter. The maximum transfer frequency of the lens, $f_m$, is $2(NA/\lambda)$. Here, NA represents the numerical aperture of the lens and $\lambda$ represents the wavelength of incident light. Though the lens functions as a kind of optical low pass filter, its maximum cutoff frequency, $f_m$, is usually considerably higher than the ideal cutoff frequency, $f_c$, of the low pass filter as shown in FIG. 4. The frequency transfer characteristic of the lens can approximate to the straight line of FIG. 4 to be mathematically modeled, and the difference between the approximate value indicated by the straight line and the actual transfer characteristic becomes smaller as $f_m$ becomes larger than $f_c$.

FIG. 5A is a perspective view showing the appearance of a conventional solid-state imaging device, and FIG. 5B is a cross-sectional view showing the conventional solid-state imaging device, taken along the line A—A of FIG. 5A. In this conventional solid-state imaging device, the covers 51 and 52 of the solid-state imaging device chips 53 and 54 are configured of a transparent glass plate because input light should be transmitted through the covers 51 and 52, that is, transparent window, to a light receiving device placed on the surface of the solid-state imaging device chip.

FIGS. 6A, 6B and 6C illustrate conventional optical low pass filters utilizing a double refraction plate, which are currently widely used as an optical low pass filter in the conventional imaging system. Referring to FIG. 6A, an input beam incident on one surface of the double refraction plate is split into two beams, having a distance, $d_n$, therebetween, while it passes through the double refraction plate. The relation among the thickness and refraction index of the double refraction plate and the distance, $d_n$, satisfies the following equation:

$$d_n = \frac{t(n_e^2 - n_o^2)}{2n_e n_o}$$

where t is the thickness of the double refraction plate, $n_e$ is the extra-ordinary refraction index and $n_o$ is the ordinary refraction index. As shown in FIG. 6B, the conventional optical low pass filter utilizing the double refraction plate is constructed in such a manner that an x-directional double refraction plate and a y-directional double refraction plate lie in piles to enable beam splitting in the x-direction and the y-direction. An IR removal filter is generally inserted between the two double refraction plates.

In the operation of the conventional optical low pass filter utilizing the double refraction plate, the input beam, vertically incident on the surface of the filter, is split into two beams at the x-directional double refraction plate, and each of these two beams is further split into two beams at the y-direction double refraction plate. Thus, one input beam is split into four beams, arriving at the light receiving element of the solid-state imager. That is, the optical low pass filter using the double refraction plate functions as a 4-beam splitter as shown in FIG. 6C. By splitting one input beam into four beams, an image having a higher spatial frequency is converted into a lower spatial frequency before sampling of the solid state imager.

The general optical transfer characteristic function of 2-plate type double refraction plate is equals to the magnitude of the absolute value of the cosine function with the period of $$\frac{1}{d_n}$$

when it is Fourier-transformed. That is, the transfer function has a value proportional to $abs(\cos(2\pi \times f \times d_n))$ where f is spatial frequency and $d_n$ is the distance between the beams split by the double refraction plate, shown in FIG. 6A. The optical transfer function of an image which passes through the optical lens to reach the double refraction plate filter is obtained by multiplying the transfer function of the lens shown in FIG. 4 by the transfer function of the double refraction plate.

In case where the double refraction plate is applied to the conventional imaging system utilizing the solid-state imager, larger loss generates in the transfer function in a spatial frequency band lower than the cutoff frequency than in the ideal optical low pass filter. This loss deteriorates the resolution of the image sensor. Furthermore, there exists a periodic transfer function in a spatial frequency band higher than the cutoff frequency so that a higher frequency component cannot be removed. This generates aliasing to thereby bring about afterglow. In other words, the optical low pass filter utilizing the double refraction plate has larger loss in a lower band and larger surplus portion in a higher band, resulting in deterioration of resolution and poor effect on the removal of afterglow. Furthermore, the frequency characteristic of the conventional double refraction plate filter is determined by the double refraction plate's thickness that is generally 0.5 mm. Thus, the size of the input part of the imaging system employing this becomes larger so that it is difficult to reduce the size of the system.

There have been proposed optical phase grating low pass filters having various structures for the purpose of improving the conventional optical low pass filter using the double refraction plate. U.S. Pat. No. 4,083,627 proposes the vertical grating filter, U.S. Pat. No. 4,083,627, and FIG. 7C propose the circular grating filter, U.S. Pat. No. 4, 009,939 discloses the lozenge-shaped grating filter. Further, U.S. Pat. No. 4,795,236 and No. 4,178,611 propose the parallel repetitive grating filter, and U.S. Pat. No. 4,795,236 suggests the optical phase grating low pass filter constructed in a manner that gratings having a refraction index different from that of a grating substrate whose both surfaces are used are repeatedly arranged in parallel.

However, most of the aforementioned optical phase grating low pass filters are not being actually utilized since they could not be manufactured. This is because the optical phase grating low pass filters of FIGS. 7A to 7E have the structures that two gratings having different phase shifts from each other are two-dimensionally arranged. Thus, according to computer simulation and Fourier transform carried out by this inventor, their performances are not remarkably improved compared to the conventional low pass filter using the double refraction plate. That is, the conventional optical phase grating low pass filter has the disadvantage that the transfer characteristic of the spatial frequency spectrum is not much improved compared to the conventional filter utilizing the double refraction plate because the optical phase grating low pass filter has the two gratings having different phases. Accordingly, it is difficult to reduce the size of the imaging system utilizing the conventional optical low pass filter using the double refraction plate and the solid-state imaging device. Also, its frequency transfer characteristic is not satisfactory. Moreover, the conventional optical phase grating low pass filter proposed for the purpose of improving the conventional optical low pass filter using the double refraction plate cannot be practically utilized because its frequency characteristic is poor.

SUMMARY OF THE INVENTION

It is, therefore, an object of the present invention to provide a solid-state imaging device having an optical low pass filter integrated thereinto and a method for manufacturing the same, the optical low pass filter increasing the optical transfer function at a frequency band lower than the ideal cutoff frequency corresponding to one-half the sampling spatial frequency of the solid-state imaging device and suppressing the transfer function at a band higher than the cutoff frequency.

It is another object of the present invention to provide a solid-state imaging device whose transparent window is configured of an optical phase grating low pass filter having excellent frequency transfer function and having a very thin thickness of 0.5 mm or less, thereby being realized in a small size and having satisfactory frequency characteristic.

To accomplish the objects of the present invention, there is provided a solid-state imaging device sensing input images, having an optical low pass filter integrated thereinto, the optical low pass filter suppressing a spatial frequency component higher than a specific frequency and passing a component lower than the specific frequency, the optical low pass filter being used as the transparent window of the solid-state imaging device. The optical low pass filter is an optical phase grating low pass filter.

To accomplish the objects of the present invention, there is provided a solid-state imaging device sensing input images, having an optical low pass filter integrated thereinto, the optical low pass filter suppressing a spatial frequency component higher than a specific frequency and passing a component lower than the specific frequency, the optical low pass filter being used as the transparent window of the solid-state imaging device, wherein the optical low pass filter comprises a plurality of basic arrangement patterns periodically arranged, wherein each of the basic arrangement pattern consists of: a φ-phase shift grating for generating the phase shift of φ, having a predetermined thickness; a 2φ-phase shift grating for generating the phase shift of 2φ, having a thickness twice of the φ-phase shift grating; and a portion for generating the phase shift of 0, having no grating. A filter for blocking IR rays or UV rays is formed on one surface of the optical low pass filter.

To accomplish the objects of the present invention, there is provided a solid-state imaging device sensing input images, having an optical low pass filter integrated thereinto, the optical low pass filter suppressing a spatial frequency component higher than a specific frequency and passing a component lower than the specific frequency, the optical low pass filter being used as the transparent window of the solid-state imaging device, wherein the optical low pass filter comprises: a first grating for generating the phase shift of φ, having a predetermined thickness and periodically arranged on one transparent grating substrate in the horizontal direction; and a second grating for generating the phase shift of φ, having a predetermined thickness and periodically arranged on the other transparent grating substrate in the vertical direction, wherein the surfaces of the first and second gratings are attached to each other facing each other, to thereby construct a structure in which a φ-phase shift grating for generating the φ-phase shift, a 2φ-phase shift grating for generating the 2φ-phase shift, and a 0-phase shift grating are periodically arranged between the two transparent grating substrates. A filter for blocking IR or UV rays is formed on one of the top face and the bottom face of the attached grating substrate structure of the optical low pass filter, or a filter for blocking IR or UV rays is formed on each of the top face and the bottom face of the attached grating substrate structure of the optical low pass filter.

To accomplish the objects of the present invention, there is also provided a solid-state imaging device sensing input images, having an optical low pass filter integrated thereinto, the optical low pass filter suppressing a spatial frequency component higher than a specific frequency and passing a component lower than the specific frequency, the optical low pass filter being used as the transparent window of the solid-state imaging device, wherein the optical low pass filter comprises: a first grating for generating the phase shift of φ, having a predetermined thickness and periodically arranged on one transparent grating substrate in the horizontal direction; and a second grating for generating the phase shift of φ, having a predetermined thickness and periodically arranged on the other transparent grating substrate in the vertical direction, wherein the surfaces of the two grating substrates on which the gratings are not formed are attached to each other facing each other, to thereby construct a structure in which a φ-phase shift grating for generating the φ-phase shift, a 2φ-phase shift grating for generating the 2φ-phase shift and a 0-phase shift grating are periodically arranged. A filter for blocking IR or UV rays is inserted between the two grating substrates.

To accomplish the objects of the present invention, there is provided a solid-state imaging device sensing input images, having an optical low pass filter integrated thereinto, the optical low pass filter suppressing a spatial frequency component higher than a specific frequency and passing a component lower than the specific frequency, the optical low pass filter being used as the transparent window of the solid-state imaging device, wherein the optical low pass filter comprises: a first grating for generating the phase shift of φ, having a predetermined thickness and periodically arranged on one surface of a transparent grating substrate in the horizontal direction; and a second grating for generating the phase shift of φ, having a predetermined thickness and periodically arranged on the other surface of the transparent grating substrate in the vertical direction, wherein the first and second gratings and the grating substrate are formed of materials having the same refraction index, to thereby construct a structure in which a φ-phase shift grating for generating the φ-phase shift, a 2φ-phase shift grating for generating the 2φ-phase shift, and a 0-phase shift grating are periodically arranged.

To accomplish the objects of the present invention, there is also provided a solid-state imaging device sensing input images, having an optical phase grating low pass filter integrated thereinto, the optical phase grating low pass filter suppressing a spatial frequency component higher than a specific frequency and passing a component lower than the specific frequency, the optical phase grating low pass filter being used as the transparent window of the solid-state imaging device.

DETAILED DESCRIPTION OF THE PREFERRED EMBODIMENT

Figure 7A:
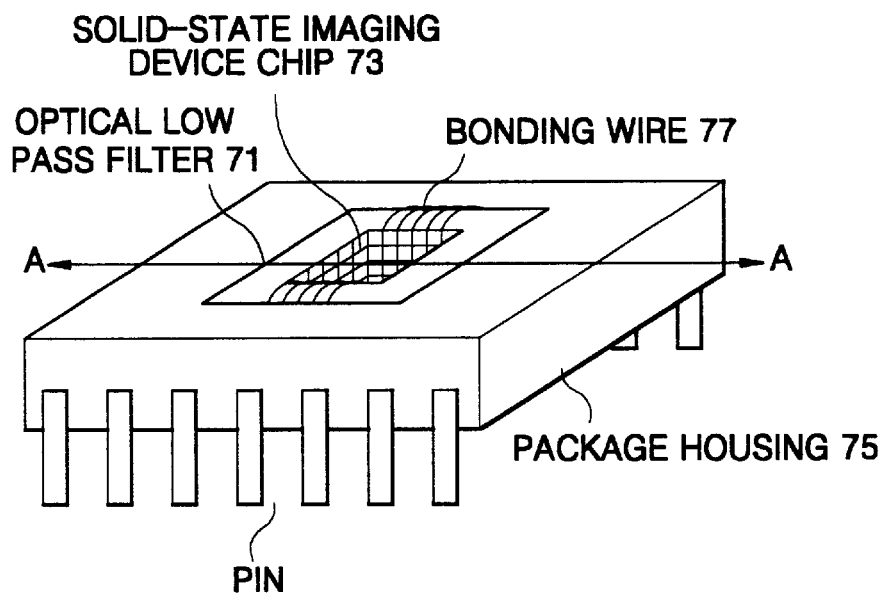
FIG. 7A is a perspective view showing the appearance of a solid-state imaging device according to the present invention.
Figure 7B:
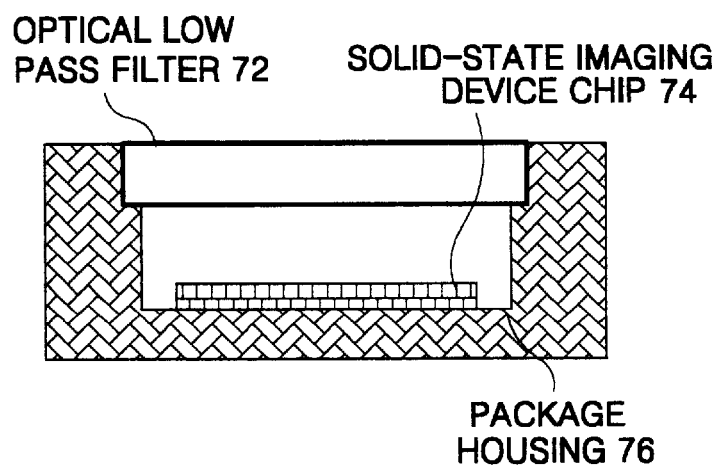
FIG. 7B is a cross-sectional view of the solid-state imaging device according to the present invention, taken along the line A—A of FIG. 7A.

FIG. 7A is a perspective view showing the appearance of a solid-state imaging device according to the present invention, and FIG. 7B is a cross-sectional view of the solid-state imaging device according to the present invention, taken along the line A—A of FIG. 7A. In the solid-state imaging device of the present invention, a transparent window 71 and 72 through which input light is transmitted is configured of an optical low pass filter. When an image is transmitted through the optical low pass filter to a light receiving device placed on the surface of the solid-state imaging device chip 72 and 73, its high spatial frequency component is removed. In case where the optical low pass filter of the present invention is applied to an imaging system, the imaging system can be constructed without using an additional optical low pass filter.

Figure 1:
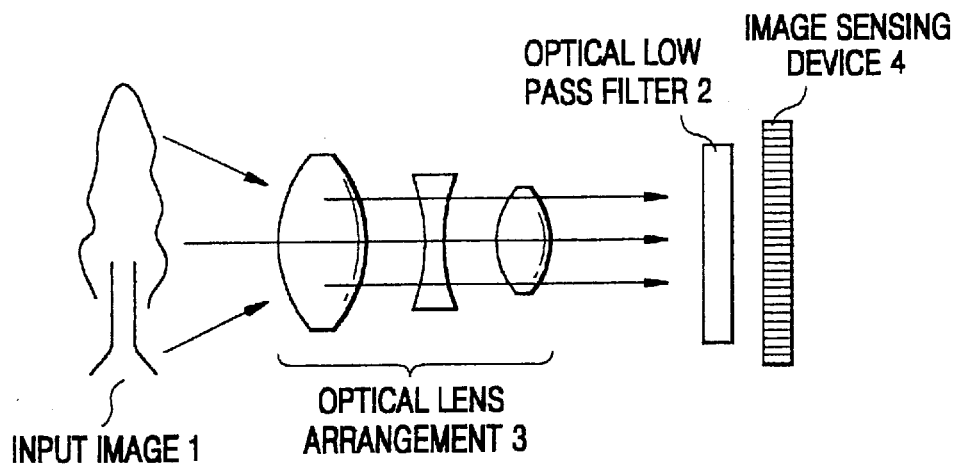
FIG. 1 shows the configuration of a conventional imaging system.
Figure 2:
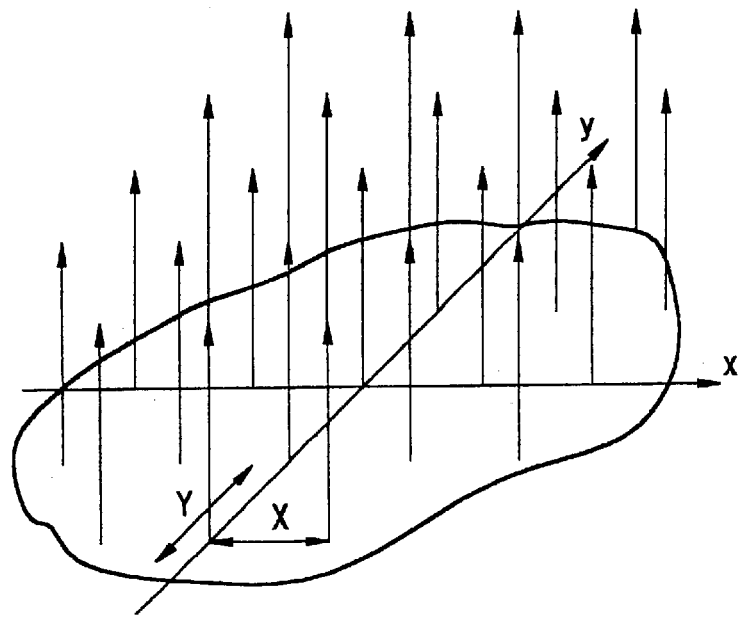
FIG. 2 is a diagram for explaining an ideal sampling in a conventional CCD or CMOS solid-state imaging device.
Figure 3A:
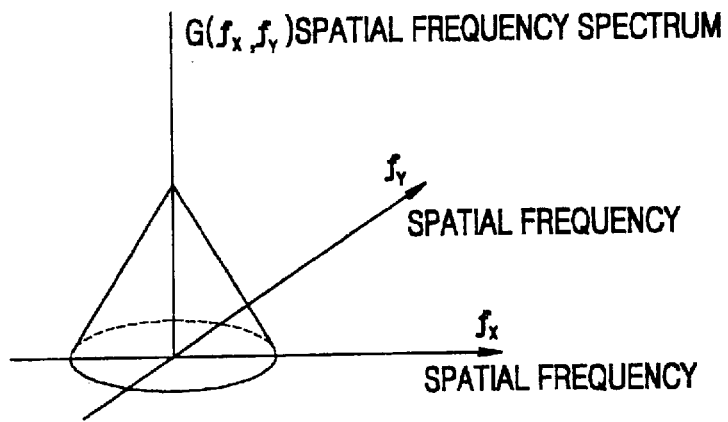
FIG. 3A is a characteristic diagram of frequency transfer function according to the ideal sampling of the two-dimensional solid-state imaging device of FIG. 2, showing original function characteristic before the sampling.
Figure 3B:
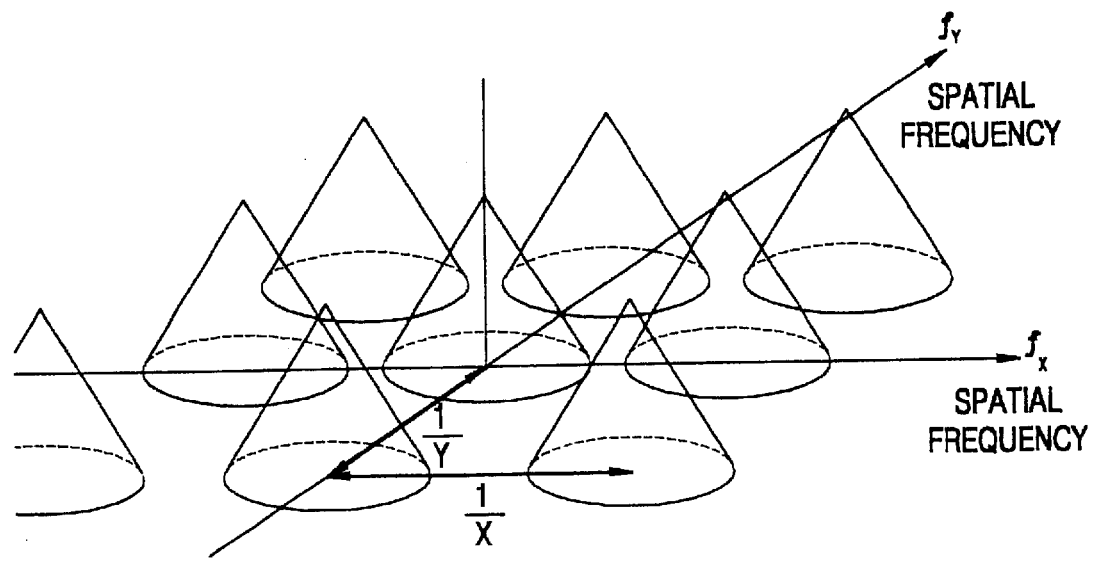
FIG. 3B is a characteristic diagram of frequency transfer function according to the ideal sampling of the two-dimensional solid state imager of FIG. 2, showing transfer function characteristic after the sampling.
Figure 8:
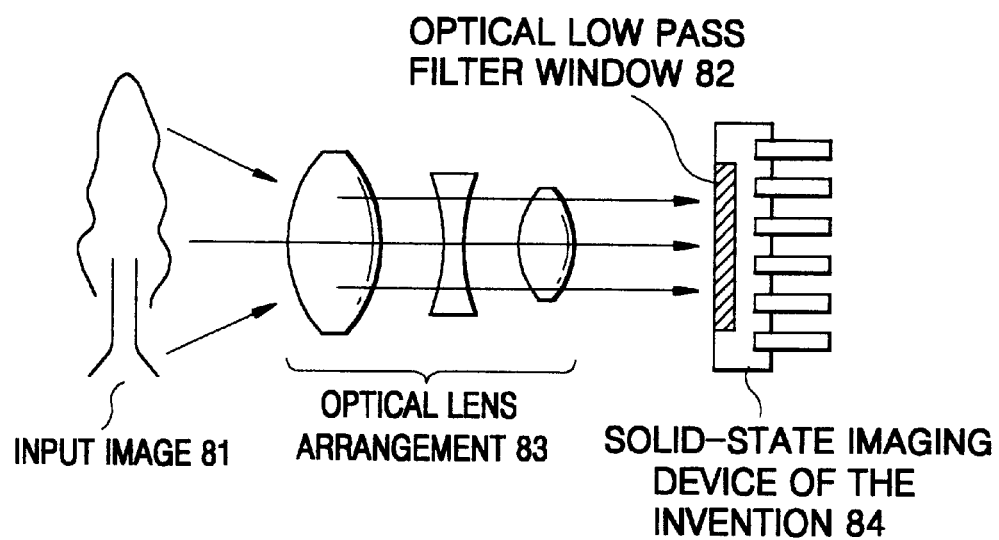
FIG. 8 shows an embodiment of the configuration of an imaging system utilizing the solid-state imaging device of the present invention.

FIG. 8 shows the configuration of an imaging system utilizing the solid-state imaging device of the present invention. Utilizing the solid-state imaging device of the present invention, the imaging system having the characteristic of cutting off a higher spatial frequency component can be constructed without employing the optical low pass filter 2 required for the conventional system using the solid-state imaging device of FIG. 1.

In the conventional double refraction plate filter, its frequency transfer characteristic is determined by the thickness of the double refraction plate, that is generally 0.5 mm. This is too thick to be applied to the transparent window of the solid-state imaging device of the present invention. Accordingly, it is not preferable that the optical low pass filter 71 and 72 of the solid-state imaging device of FIGS. 7A and 7B is configured of using the conventional optical low pass filter employing the double refraction plate filter.

The optical phase grating low pass filters proposed in U.S. Pat. No. 4,083,627, U.S. Pat. No. 4,795,236, U.S. Pat. No. 4,009,939, and U.S. Pat. No. 4,178,611 to remedy the shortcoming of the conventional optical low pass filter using the double refraction plate could not be practically utilized because they do not have satisfactory frequency characteristics as described above. Accordingly, to construct the solid-state imaging device into which the optical low pass filter is integrated, it is the most preferable to employ the optical phase grating low pass filter, which is the preceding technique (Korean Pat. App. No. 99-46950) applied by the present inventor, as the transparent window of the solid-state imaging device. In this case, the basic spirit and scope of the present invention is not limited because the transparent window of the solid-state imaging device is simply replaced with the optical low pass filter.

An Embodiment of the Present Invention

Figure 9A:
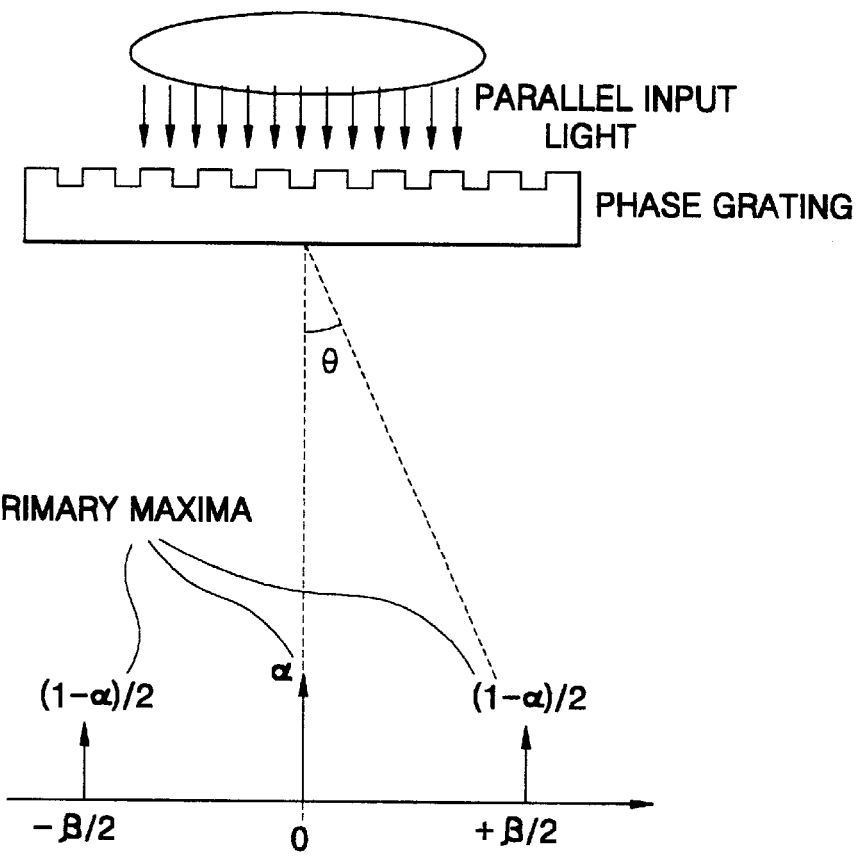
FIGS. 9A and 9B show the one-dimensional basic conception of an optical phase low pass filter according to the present invention.
Figure 9B:
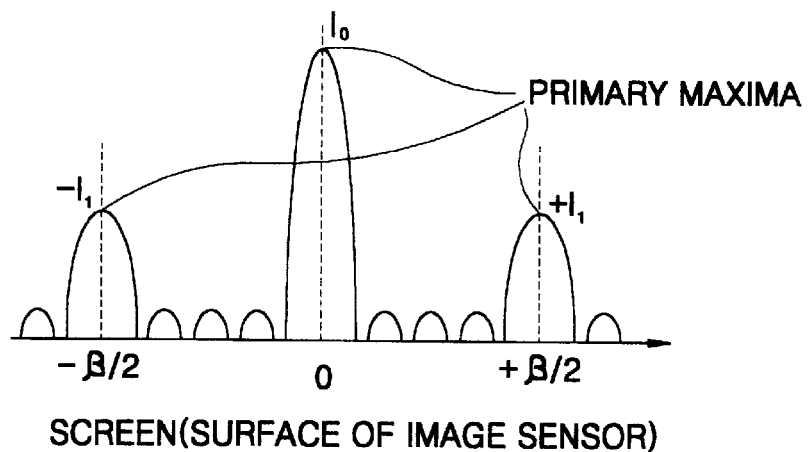

FIGS. 9A and 9B show the one-dimensional basic conception of the optical low pass filter using the phase grating proposed in the preceding applied technique (Korea Pat. Appl. No. 99-46950), which is the most suitable to be used in the solid-state imaging device of the present invention. The surface of the phase grating has a grating with a prominence and depression having a predetermined repetitive period. The phase difference between the vertical prominence portion and depression portion of the phase grating for the light transmitted through the grating corresponds to a specific phase shift, $\phi$, determined by the thickness of the grating.

In the optical transfer characteristic of the one-dimensional grating of the present invention, when parallel light, vertically incident on the surface of the grating, arrives at the surface of the image sensor, as shown in FIG. 9A, the light has the principal maxima of 0, +1 and −1 and has lower optical transfer characteristic at a region other than the principal maxima. Here, when the light intensity of the 0-principal maximum is $\alpha$, the beams of +1 and −1 are located at points distant from $$+\frac{\beta}{2} \text{ and } -\frac{\beta}{2}$$

from the starting point, respectively, and their intensities become to $$\frac{1-\alpha}{2}.$$

The spatial transfer characteristic of the grating of FIG. 9A is expressed by the following equation:

$$I(x) = \alpha\delta(x) + 0.5(1-\alpha)\left[\delta\left(x-\frac{\beta}{2}\right) + \delta\left(x+\frac{\beta}{2}\right)\right]$$

where $\delta(x)$ represents impulse function. When the spatial transfer characteristic, $I(x)$, is Fourier-transformed, the frequency transfer function ($L_G$) of the one-dimensional phase grating filter of the present invention can be obtained. $L_G$ is given by the following equation.

$$L_G(f) = \alpha + (1-\alpha)\cos(\pi\beta f).$$

Figure 4:
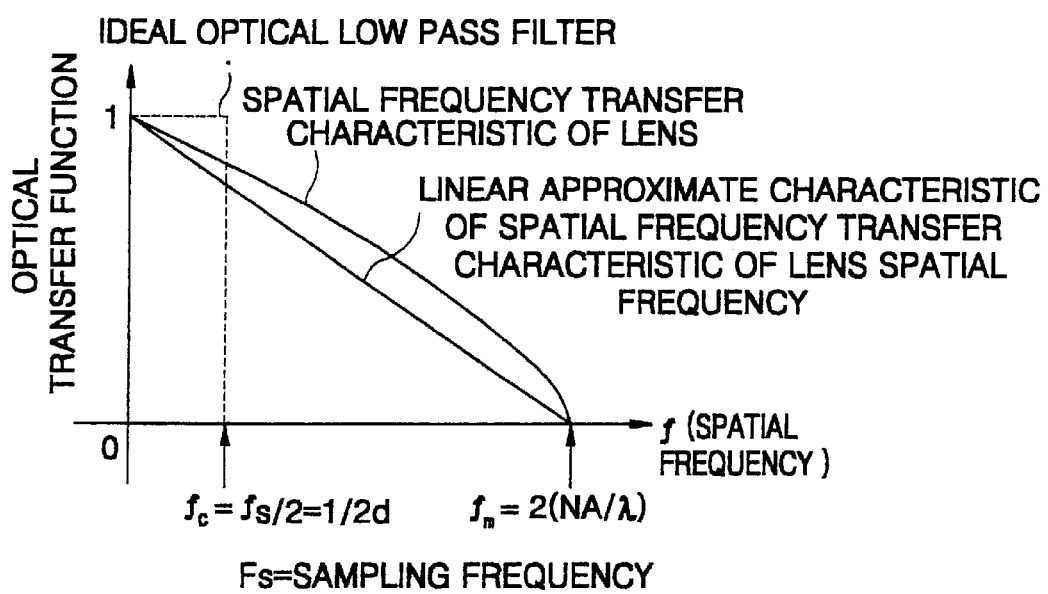
FIG. 4 is a function characteristic diagram showing the spatial frequency transfer characteristic of an optical lens and characteristic of an ideal optical low pass filter in a conventional imaging system.
Figure 5A:
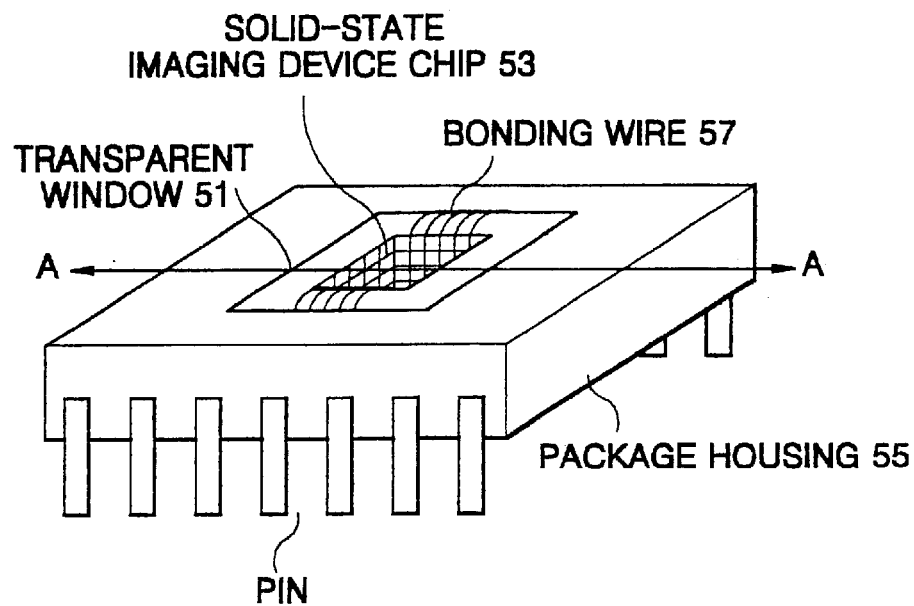
FIG. 5A is a perspective view showing the appearance of a conventional solid-state imaging device.
Figure 5B:
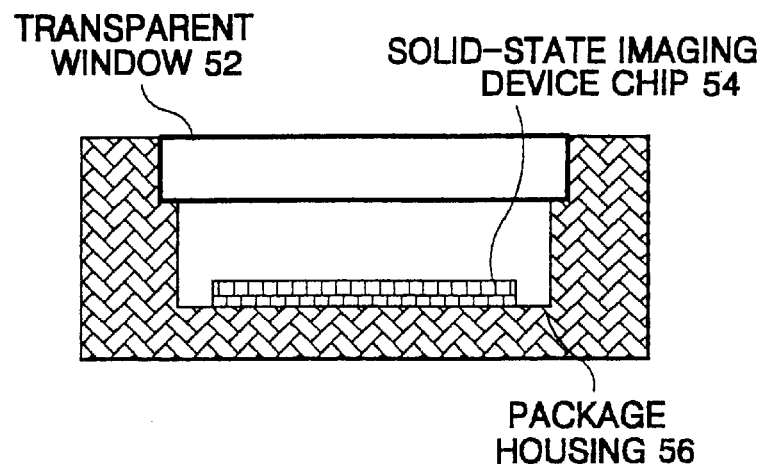
FIG. 5B is a cross-sectional view of the conventional solid-state imaging device, taken along the line A—A of FIG. 5A.
Figure 6A:
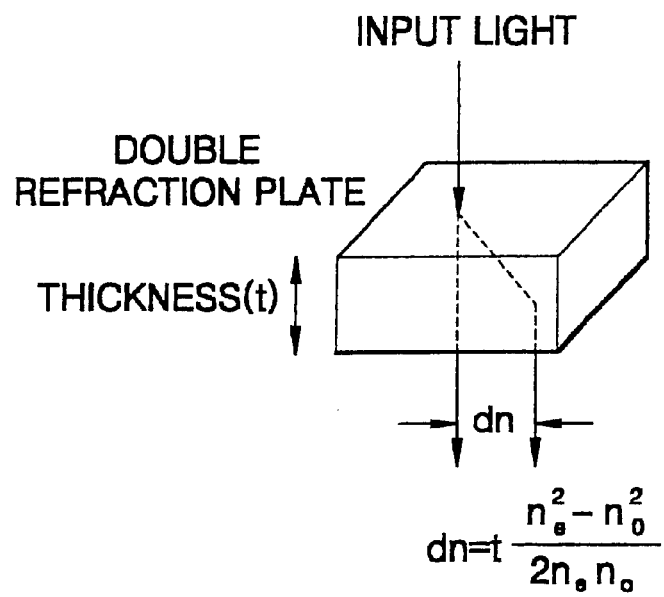
FIG. 6A shows the configuration of a conventional optical low pass filter utilizing a double refraction plate, for explaining the diffraction characteristic of the double refraction plate.
Figure 6B:
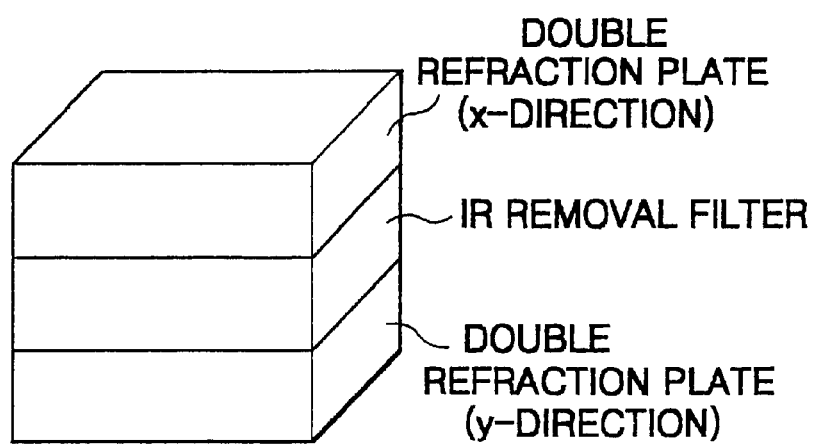
FIG. 6B shows the configuration of a conventional optical low pass filter utilizing a 3-plate type double refraction plate.
Figure 6C:
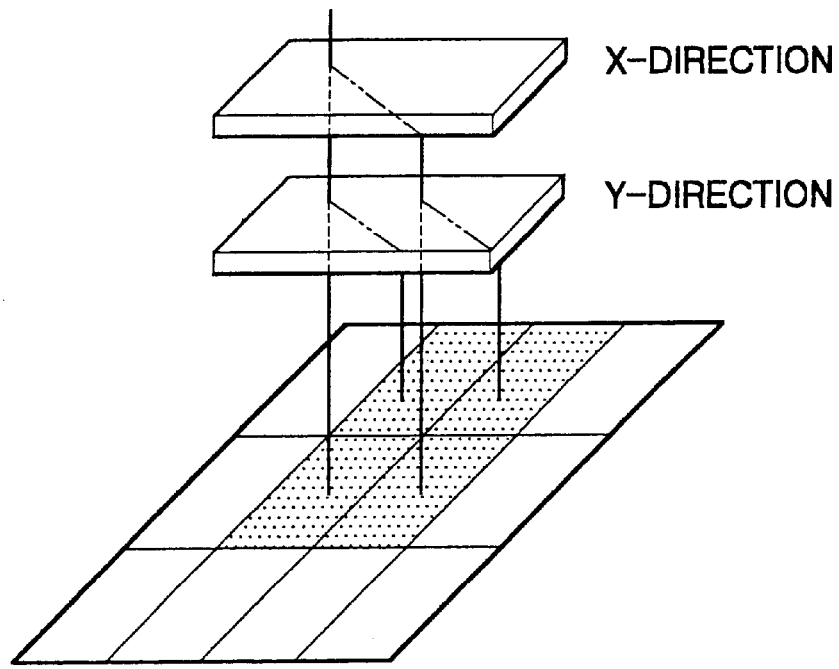
FIG. 6C shows the configuration of the conventional optical low pass filter utilizing the double refraction plate, illustrating the operation characteristic of the conventional double refraction plate filter.

FIG. 9B shows the frequency transfer characteristic. In FIG. 9B, small values between the principal maxima can be ignored compared to the values of the principal maxima. There will be obtained below the value $\alpha$ for minimizing the difference between the ideal characteristic of the optical low pass filter and the actual frequency characteristic of the low pass filter. When let the difference between the ideal characteristic and actual characteristic be $\Delta$, $$\Delta = \int_0^{f_m}(L_{ideal} - L_{lens} \times L_G)^2 df$$

where f is the spatial frequency, $f_m$ is the maximum spatial transfer frequency of the lens, $L_{ideal}$ is the ideal transfer characteristic of the optical low pass filter, $L_{lens}$ is the transfer characteristic of the lens, and $L_G$ is the frequency transfer characteristic of the phase grating of the present invention. As shown by the dotted line in FIG. 4, $L_{ideal}$ becomes 1 when the spatial frequency is lower than the ideal cutoff frequency $f_c$ of the optical low pass filter and 0 when larger than $f_c$. That is, $L_{ideal}=1$, $f<f_c$ and $L_{ideal}=0$, $f \geq f_c$. $L_{lens}$ can be represented by the equation, $L_{lens}=1-f/f_m$, if it is assumed that the transfer characteristic is linear when its $f_m$ is very larger than $f_c$.

It can be known that $\Delta$ has a value proportional to $f_m[\alpha^2+0.5(1-\alpha)^2]$ when $\Delta$ is obtained by applying the formulae of $L_{ideal}$, $L_{lens}$, and $L_G$ to the above-described integral equation. Here, the value $\alpha$ for minimizing $\Delta$ becomes ⅓. Consequently, in order to minimize the difference between the ideal filter characteristic and the actual characteristic of the optical phase grating low pass filter of the invention, the input beam must be equally split into the three principal maxima of 0, +1 and −1.

Figure 10:
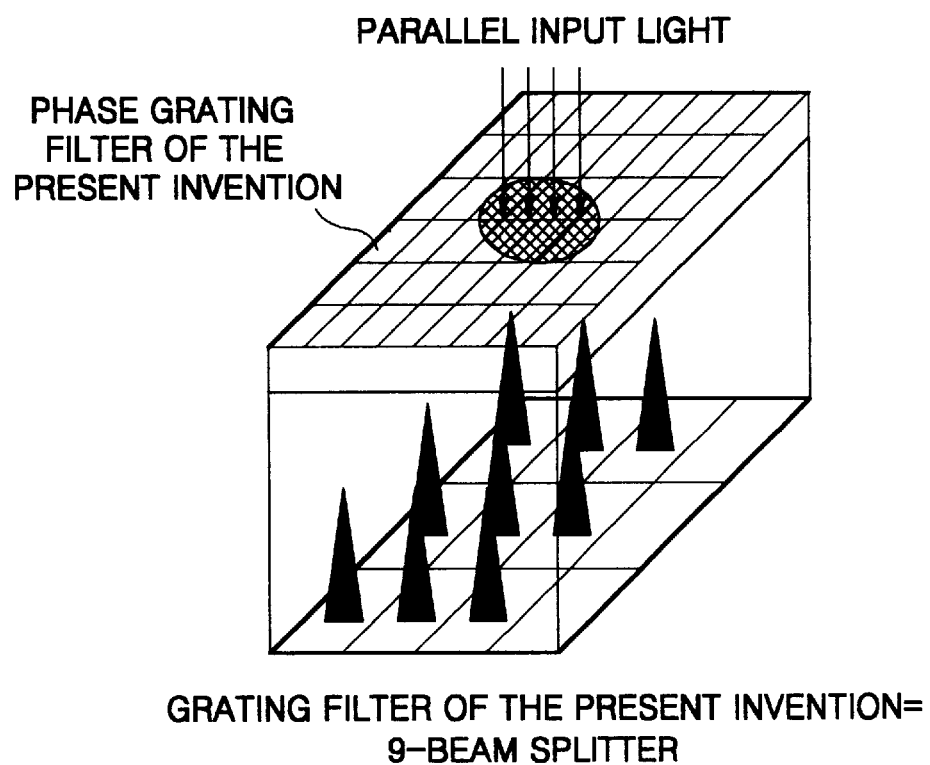
FIG. 10 is a diagram for explaining the operation of a two-dimensional optical phase grating low pass filter according to the present invention.

When the phase grating which equally splits input beam into three, designed by the preceding applied technique, is two-dimensionally arranged as shown in FIG. 10, the input beam is equally split into nine principal maxima. The two-dimensional grating of the present invention operates as the optical low pass filter because the input parallel beam is split into nine beams so that an image having the higher spatial frequency of the input beam into a lower frequency band. The basic arrangement is constructed in such a manner that a phase shift grating is arranged at the right and bottom of a 0-phase shift grating, adjacent thereto, and a 2-phase shift grating is located at the diagonal side of the 0-phase shift grating. This basic arrangement pattern is repeated to realize the optical low pass filter.

Figure 11A:
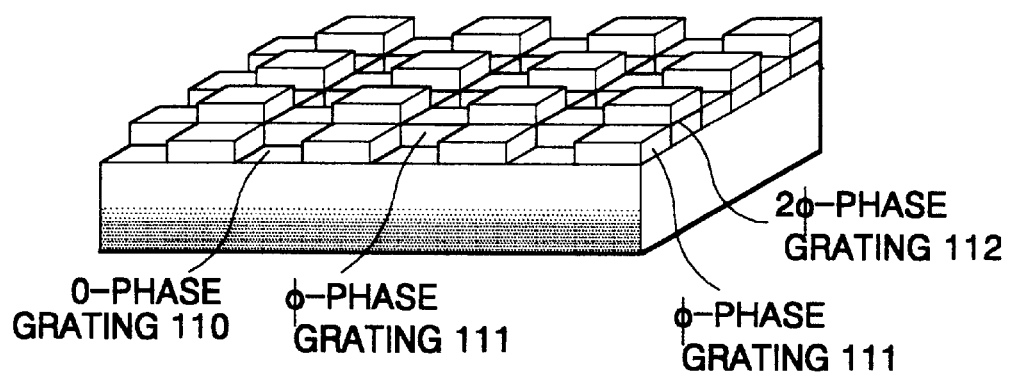
FIG. 11A is a schematic perspective diagram of an embodiment of the phase grating structure of the optical phase grating low pass filter of the present invention.
Figure 11B:
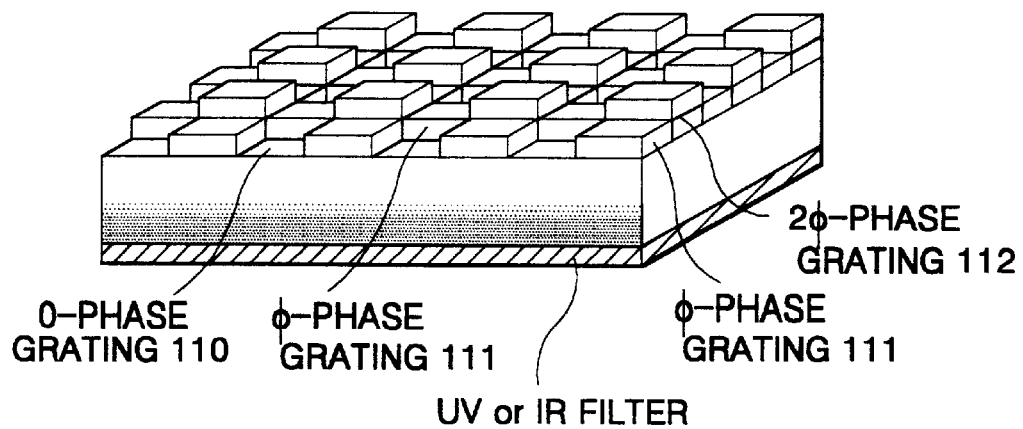
FIG. 11B is a schematic perspective diagram another embodiment of the optical phase grating low pass filter of the present invention when it is combined with an infrared or ultraviolet filter.

The phase shift difference in the optical phase-shift low pass filter of the present invention is realized by arranging a grating having a specific thickness. FIGS. 11A and 11B illustrate a structure of the phase grating for realizing the present invention. If a grating with a specific thickness generates the phase shift of $\phi$, a grating with a thickness twice the specific thickness generates the phase shift of $2\phi$ and a portion where there is no grating generates the phase shift of 0. The basic arrangement of the grating is constructed in such a manner that the $\phi$-phase shift grating (111, 1111) is placed at the right and bottom of the 0-phase shift grating, adjacent thereto, and the $2\phi$-phase shift grating (112) with a thickness twice the $\phi$-phase shift grating is located at the diagonal side of the 0-phase shift grating. This basic arrangement pattern is repeated to realize the optical low pass filter.

The solid-state imaging device into which the optical low pass filter is integrated, shown in FIG. 7, can be realized by replacing the transparent window 71 and 72 with the optical low pass filter of FIG. 11A. FIG. 11B shows that a filter for blocking IF rays or UV rays is attached to one surface of the optical low pass filter of FIG. 11A. In case where the transparent window 71 and 72 of FIG. 7 is replaced with the optical low pass filter structure of FIG. 11B, a solid-state imaging device into which the IR or UV filter and the optical low pass filter are integrated can be constructed.

In fabrication of the phase shift grating of the invention, the thickness of the grating may be changed a little during the fabrication process. Even in this case, however, the thickness variation does not obstruct practical application of the present invention if error in the phase shift due to the grating is not larger than $\phi$. Accordingly, a very small error of phase shift due to a minute variation in the grating's thickness does not depart from the basic spirit and scope of the present invention.

Another Embodiment of the Invention

Figure 12A:
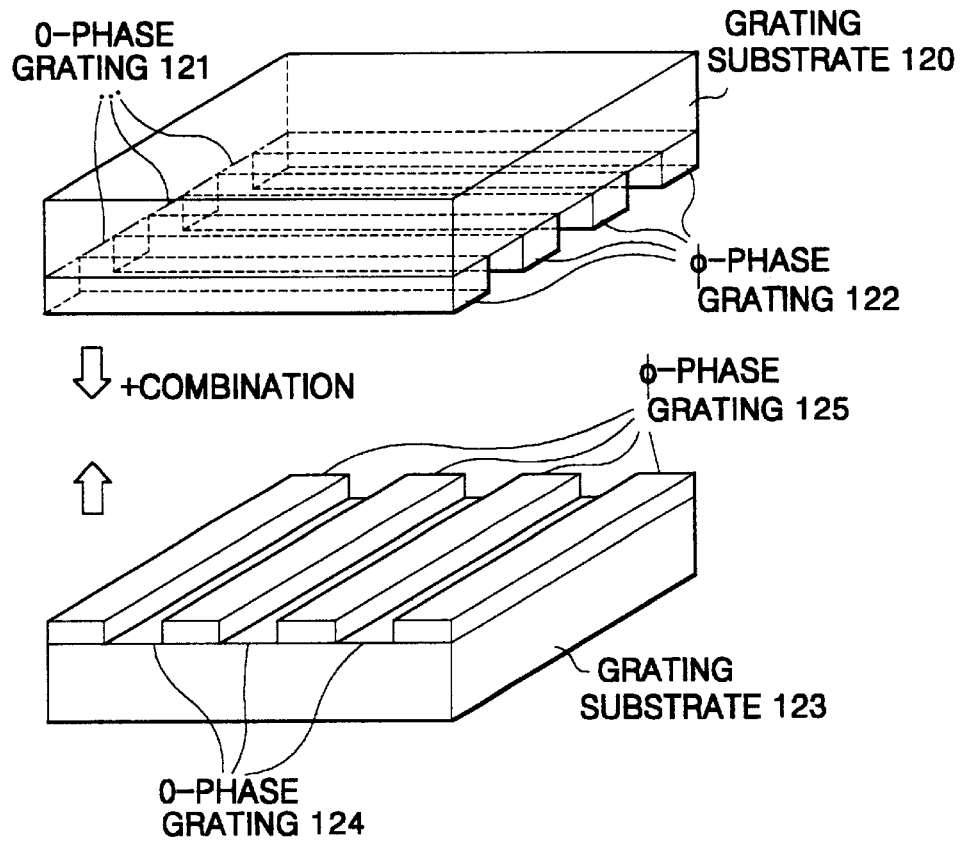
FIG. 12A is a schematic perspective diagram of another embodiment of the grating structure of the optical phase grating low pass filter of the present invention before attachment.
Figure 12B:
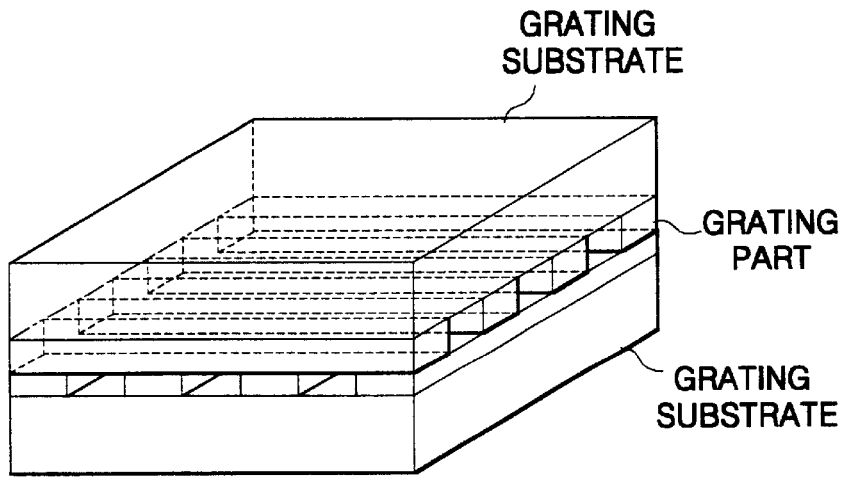
FIG. 12B is a schematic perspective diagram of another embodiment of the grating structure of the optical phase grating low pass filter of the present invention after attachment.

FIGS. 12A and 12B show another embodiment of the optical phase grating low pass filter of the present invention.

To arrange the grating to have the phase shift 0 at a predetermined portion, $\phi$ at the right and bottom of the 0-phase shift and $2\phi$ at the diagonal side of the 0-phase shift, as shown in FIG. 11A, a grating 122 for shifting the phase by $\phi$ is periodically arranged in parallel on a grating substrate 120 in the direction y, a grating 125 for shifting the phase by $\phi$ is periodically arranged in parallel on a grating substrate 123 in the direction x, and the two grating surfaces are attached to each other, facing each other, to thereby construct the optical phase grating low pass filter. The grating and the substrate are preferably fabricated with materials having the same refraction index. The transparent window of the solid-sate imaging device of the present invention of FIG. 7 can be replaced by the optical low pass filter of FIG. 12B, to construct the solid-state imaging device into which the optical low pass is integrated.

Figure 13A:
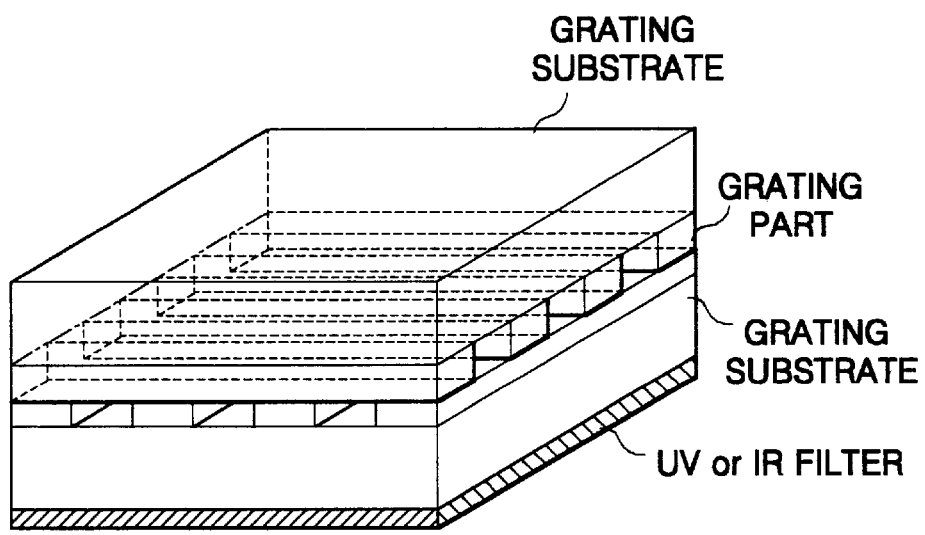
FIG. 13A is a schematic perspective diagram of another embodiment of the grating structure of the optical phase grating low pass filter of the present invention, the phase grating structure being combined with an infrared or ultraviolet filter placed on the top or bottom thereof.
Figure 13B:
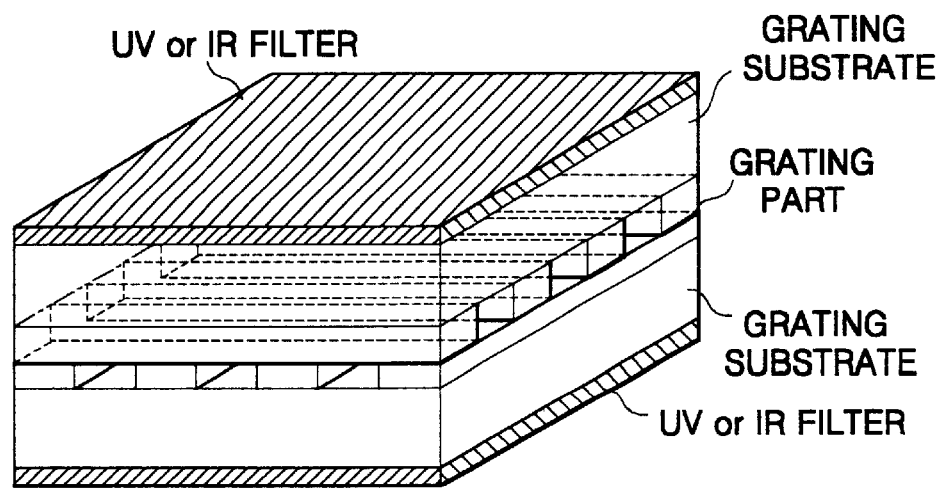
FIG. 13B is a schematic perspective diagram of another embodiment of the grating structure of the optical phase grating low pass filter of the present invention, the phase grating structure being combined with infrared or ultraviolet filters placed on the top and bottom thereof.

FIG. 13A shows a structure in which the IR or UV filter is attached to one surface of the optical low pass filter of FIG. 12B. In case where the transparent window 71 and 72 of the solid-state imaging device of FIG. 7 is replaced with the optical low pass filter structure of FIG. 13A, a solid-state imaging device into which the optical low pass filter with the IR or UV filter are integrated can be constructed. FIG. 13B shows a structure in which the IR or UV filter is attached to each of both surfaces of the optical low pass filter of FIG. 12B. In case where the transparent window 71 and 72 of the solid-state imaging device of FIG. 7 is replaced with the optical low pass filter structure of FIG. 13B, a solid-state imaging device into which the optical low pass filter with the IR or UV filter are integrated can be constructed.

In fabrication of the phase shift grating of the invention, the thickness of the grating may be changed a little during the fabrication process. Even in this case, however, the thickness variation does not obstruct practical application of the present invention if the phase shift error due to the grating is not larger than $\phi$. Accordingly, a very small error of phase shift due to a minute variation in the grating's thickness does not depart from the basic spirit and scope of the present invention.

Another Embodiment of the Invention

Figure 14A:
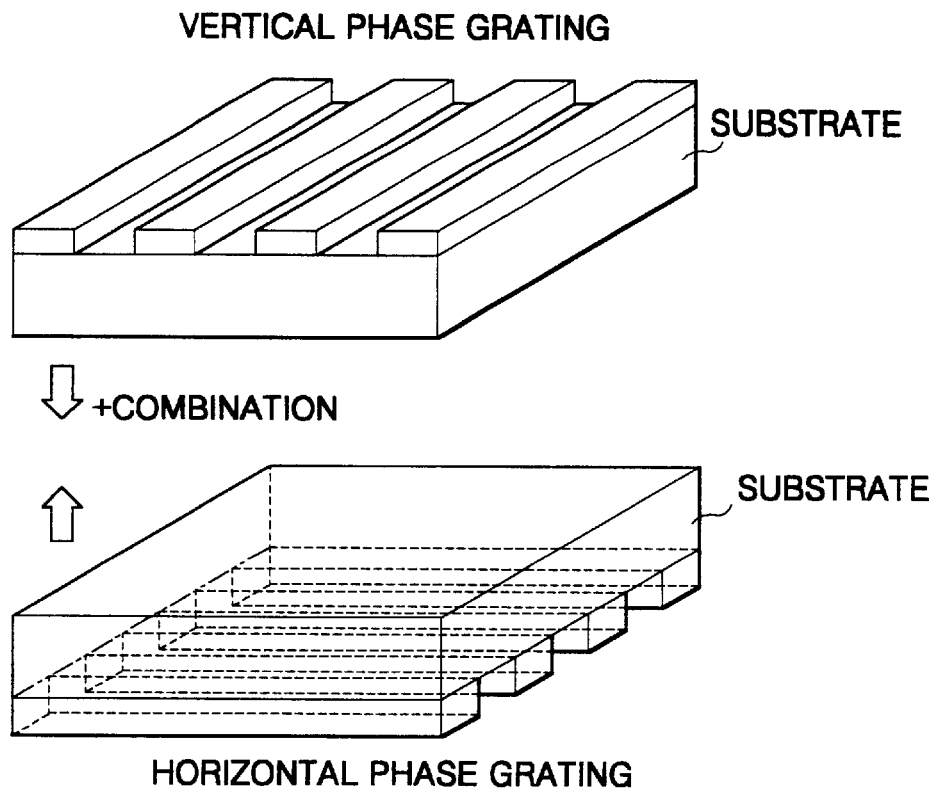
FIG. 14A is a schematic perspective diagram of another embodiment of the grating structure of the optical phase grating low pass filter of the present invention before attachment.
Figure 14B:
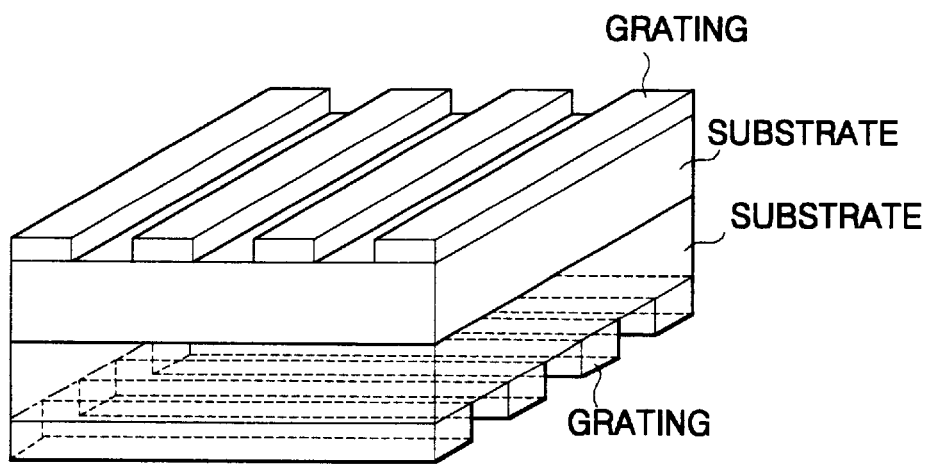
FIG. 14B is a schematic perspective diagram of another embodiment of the grating structure of the optical phase grating low pass filter of the present invention after attachment.

FIG. 14A shows gratings arranged in x-direction and y-direction, respectively. FIG. 14B shows the structure after the two gratings are combined with each other. By attaching the surfaces of the two grating substrates on which the gratings are not formed to each other, a portion where the 0-grating and 0-grating meet each other becomes a 0-phase grating part, a portion where the 0-grating and $\phi$-grating, or $\phi$-grating and 0-grating meet each other becomes a $\phi$-phase grating part, and a portion where the $\phi$-grating and $\phi$-grating meet each other becomes a $2\phi$-phase grating part.

In fabrication of the phase shift grating of the invention, the thickness of the grating may be changed a little during the fabrication process. Even in this case, however, the thickness variation does not obstruct practical application of the present invention if the phase shift error due to the grating is not larger than $\phi$. Accordingly, a very small error of phase shift due to a minute variation in the grating's thickness does not depart from the basic spirit and scope of the present invention.

The transparent window 71 and 72 of the solid-sate imaging device of the resent invention of FIG. 7 can be replaced by the optical low pass filter of FIG. 14B, to construct the solid-state imaging device into which the optical low pass filter is integrated.

Figure 15:
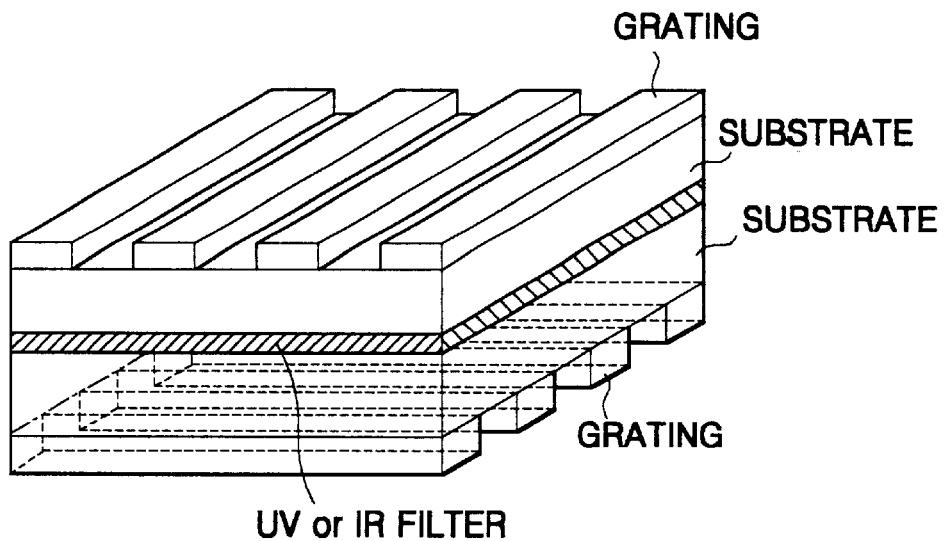
FIG. 15 is a schematic perspective diagram of another embodiment of the grating structure of the optical phase grating low pass filter of the present invention.

In construction of the imaging system, the optical low pass filter is usually combined with the IR or UV filter. Accordingly, when the two grating substrates are attached to each other as shown in FIG. 14A, a coating layer or filter plate for removing IR rays or UV rays is inserted between the two grating substrates as shown in FIG. 15, to thereby accomplish the optical low pass filter into which the IR or UV filter is integrated. The transparent window 71 and 72 of the solid-sate imaging device of the presents invention of FIG. 7 can be replaced by the optical low pass filter of FIG. 15, to realize the solid-state imaging device having the optical low pass filter and the IR or UV filter integrated thereinto.

In fabrication of the phase shift grating of the invention, the thickness of the grating may be changed a little during the fabrication process. Even in this case, however, the thickness variation does not obstruct practical application of the present invention if the phase shift error due to the grating is not larger than $\phi$. Accordingly, a very small error of phase shift due to a minute variation in the grating's thickness does not depart from the basic spirit and scope of the present invention.

Another Embodiment of the Present Invention

Figure 16:
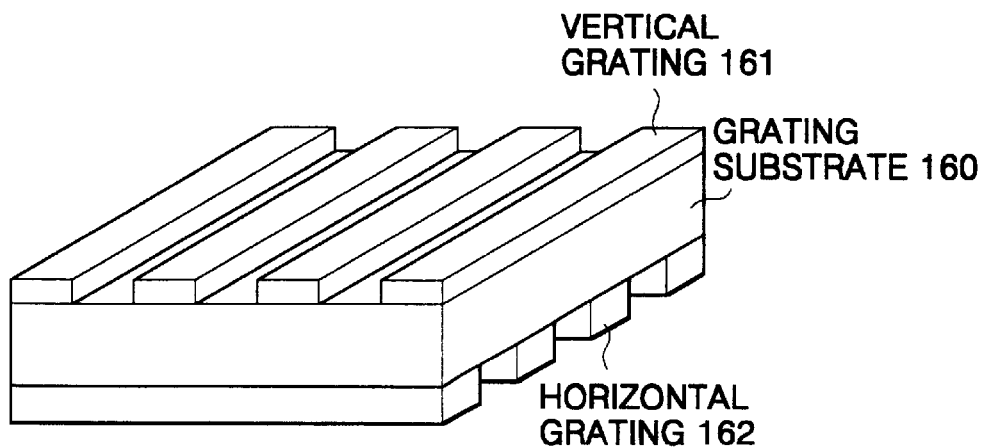
FIG. 16 is a schematic perspective diagram of another embodiment of the grating structure of the optical phase grating low pass filter of the present invention.

FIG. 16 shows another configuration of the optical phase grating low pass filter of the present invention. To arrange the grating with the phase shift 0 at a predetermined portion, $\phi$ at the right and bottom of the 0-shift portion, and $2\phi$ at the diagonal side of the 0-shift portion, as shown in FIG. 11A, a grating 161 for shifting the phase by $\phi$ is periodically arranged in parallel on one surface of a grating substrate 160 in the direction y and a grating 162 for shifting the phase by $\phi$ is periodically arranged in parallel on the other surface of the grating substrate 160 in the direction x, to thereby construct the optical phase grating low pass filter. The grating and the substrate are preferably fabricated with materials having the same refraction index. According to this structure in which the two gratings 161 and 162 are respectively arranged on the both surfaces of the substrate 160, perpendicular to each other, a portion where light transmitted through 0-the phase grating passes through the 0-phase grating becomes a 0-phase grating part, a portion where light transmitted through the 0-phase grating passes through the $\phi$-phase grating or light transmitted through the $\phi$-phase grating passes through the 0-phase grating becomes a $\phi$-phase grating part, and a portion where light transmitted through the $\phi$-phase grating passes through the $\phi$-phase grating becomes a $2\phi$-phase grating part.

The transparent window 71 and 72 of the solid-sate imaging device of the present invention of FIG. 7 can be replaced by the optical low pass filter of FIG. 16, to realize the solid-state imaging device into which the optical low pass filter is integrated In fabrication of the phase shift grating of the invention, the thickness of the grating may be changed a little during the fabrication process. Even in this case, however, the thickness variation does not obstruct practical application of the present invention if the phase shift error due to the grating is not larger than $\phi$. Accordingly, a very small error of phase shift due to a minute variation in the grating's thickness does not depart from the basic spirit and scope of the present invention.

The present invention provides the solid-state imaging device into which the optical low pass filter serving as the transparent window thereof is integrated. According to the present invention, the optical phase grating low pass filter replaces the transparent window of the solid-state imaging device, to construct the imaging system smaller in size than the conventional one employing a separate optical low pass filter. Furthermore, the imaging system has frequency characteristic more excellent than that of the conventional imaging system using the double refraction plate.

What is claimed is:

1. Optical low pass filter in an imaging system device sensing input images, suppressing a spatial frequency component higher than a specific frequency, passing a component lower than the specific frequency, and being used as the transparent window of the imaging system device sensing input images, the optical low pass filter comprising:

a first grating for generating a phase shift of $\phi$, having a predetermined thickness and periodically arranged on one transparent grating substrate in a horizontal direction; and a second grating for generating a phase shift of $\phi$, having a predetermined thickness and periodically arranged on another transparent grating substrate in a vertical direction, wherein the surfaces of the first and second gratings are attached to and facing each other, forming an angle of 90°, to thereby construct a grating substrate structure having opposite first and second faces and in which a $\phi$-phase shift grating for generating the $\phi$-phase shift, a $2\phi$-phase shift grating for generating the $2\phi$-phase shift, and a 0-phase shift grating are periodically arranged between the two transparent grating substrates, wherein a filter for blocking IR or UV rays is formed on each of the first and second faces of the grating substrate structure.

2. Optical low pass filter in an imaging system device sensing input images, suppressing a spatial frequency component higher that a specific frequency, passing a component lower than the specific frequency, and being used as the transparent window of the imaging system devise sensing input images, the optical low pass filter comprising:

a first grating for generating a phase shift of $\phi$, having a predetermined thickness and periodically arranged on one transparent grating substrate in a horizontal direction; and a second grating for generating a phase shift of $\phi$, having a predetermined thickness and periodically arranged on another transparent grating substrate in a vertical direction, wherein the surfaces of the two transparent grating substrates are attached to and facing each other, forming an angle of 90°, to thereby construct a grating substrate structure having opposite first and second faces and in which a $\phi$-phase shift grating for generating the $\phi$-phase shift, a $2\phi$-phase shift, and a 0-phase shift grating are periodically arranged between the two transparent grating substrates, wherein a filter for blocking IR or UV rays is formed on each of the first and second faces of the grating substrate structure.

* * * * *